Inventors:
Fritz Vohmann
Erich Trinkelmann
By Wm. E. Evans
attorney

Patented Jan. 26, 1937

2,069,024

UNITED STATES PATENT OFFICE 2,069,024

PROCESS AND APPARATUS FOR CLARIFYING COAL SLURRY AND THE LIKE

Fritz Vohmann and Erich Trümpelmann, Saarbrucken, Germany, assignors to Gesellschaft für Förderanlagen Ernst Heckel mit beschränkter Haftung, Saarbrucken, Saar Territory Application November 30, 1934, Serial No. 755,446
In Germany January 5, 1933

6 Claims. (Cl. 210—58)

The invention relates to a process and apparatus for clarifying coal slurry and the like by causing the solid constituents of the slurry to be separated under the action of a precipitating agent while the slurry is flowing downwardly, whereupon the clarified liquid is permitted to rise gently in a settling receptacle and to flow away, the solid constituents being collected in the receptacle.

According to the invention the slurry is subjected to the action of a precipitating agent adapted to induce turbulence, such as potato flour or similar flake-forming additions and the solid constituents are separated from the downwardly flowing slurry in inclined hollow bodies, the discharge ends of which extend into a receptacle much larger in cross-section where the liquid that has been clarified rises immediately after leaving the hollow bodies and flows away at the top, while the solid constituents, unaffected by the rising liquid, sink to the bottom of the receptacle and become concentrated adjacent a discharge opening, whereupon they are drawn off from the receptacle at intervals or continuously with the concentration desired and dried in slurry centrifuges or on suction filters.

The hollow bodies are relatively small in cross-section. They are not identical with the inclined settling surfaces which are provided in clarifying vessels of known construction, in order to effect local limitation of unsuitable movements such as will hinder the process of clarification, or in order to assist in causing the solid constituents that sink in the rising slurry to be precipitated in the clarifying receptacle.

It has been found as the result of many laboratory experiments that it is essential to clarify the slurry not whilst it is rising but as it is flowing down, because in this case the speed at which the solid constituents settle is increased by the speed at which the slurry is flowing. In clarifying apparatus in which clarified water and slurry move in opposite directions the settling speed is reduced even if settling is not completely arrested.

It is important that the clarifying process should be completely finished in the hollow bodies before the slurry reaches the receptacle in which the liquid rises, in order that the solid constituents that have been removed shall not be exposed to any upward flow, but can settle quietly on the bottom of the receptacle where they accumulate and concentrate until they are drawn off continuously or at intervals when required.

A fundamental condition for obtaining the rapid and perfect clarification of the slurry is the particular form, as to length and shape, of the hollow bodies, the cross-section of which must be much smaller than that of the receptacle in which the liquid rises and into the lower part of which the hollow bodies extend and in which the speed of rising is so small that eddies do not form.

Furthermore, it is advantageous to provide a number of hollow bodies similar to one another and of such dimensions, and so disposed, that all are charged to exactly the same level. The hollow bodies may be inside or outside the receptacle in which the liquid rises and may be of a length sufficient to enable the clarifying process to be carried out completely. In order to save space and to assist the clarifying process, it is advisable to form the hollow bodies as helices arranged around or in the receptacle in which the liquid rises, the inlet ends extending uniformly into a feed channel which is fed by a supply pipe by way of a distributor hood with inclined feed surface.

According to the invention, the inlet ends of the hollow bodies may be provided with slots, notches, holes or the like, in order to ensure the uniform entry and passage of the slurry into the hollow bodies, even when the inflow is intermittent. The slots are advantageously of such construction that their cross-section increases in the upward direction, whereby any differences in height of the inlet ends are corrected, and their inlet cross-section is automatically adjusted to the quantity of slurry entering at any moment. The inlet ends may however, be provided with nozzles fitted by means of a screw-thread or the like in order that the height at which they are placed may be adjusted.

Several constructions of apparatus according to the invention are diagrammatically illustrated by way of example in the accompanying drawing.

Figure 1:
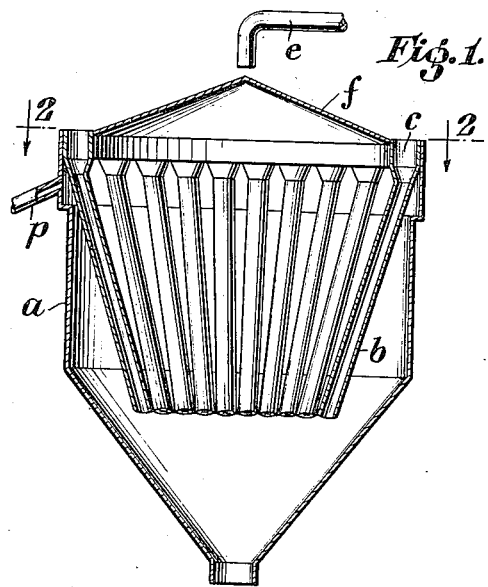
Fig. 1 is a central vertical section through a clarifying apparatus in which the receptacle is of cylindrical form and the separating bodies are grouped in conical form.
Figure 2:
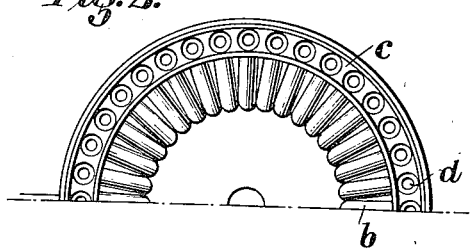
Fig. 2 is a section on the line 2—2 of Fig. 1.

Figures 1 and 2 illustrate a receptacle a circular in cross-section, in which the inclined hollow bodies b converge like rays downwardly towards the centre of the receptacle. The hollow bodies b may be in the form of helices in order to obtain the necessary length and inclination. In this case they lie advantageously close against the inner or outer wall of the receptacle. The inlet ends d, which all extend regularly into an inlet channel c, are fed from a delivery device e above the inclined surface of the conical distributor hood f, while the discharge outlet for the clarified liquid is provided beneath the inlet channel c.

Figure 3:
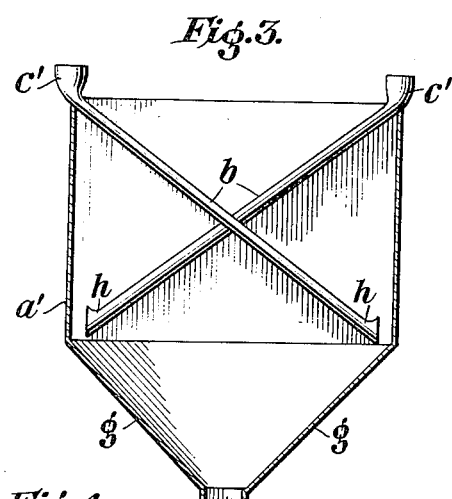
Fig. 3 is a vertical section through a clarifying apparatus in which the receptacle is of rectangular form.
Figure 4:
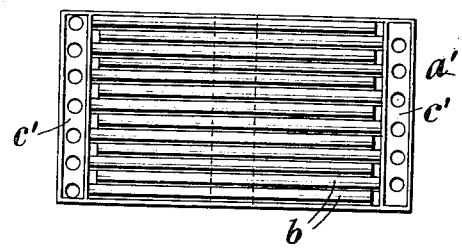
Fig. 4 is a top plan view of Fig. 3.

Figures 3 and 4 show in vertical section and plan respectively a rectangular clarifying receptacle a' into which extend in rows a number of hollow bodies b connected at their upper ends to receivers or inlet channels for the slurry disposed along the opposed sides of the receptacle, their outlet ends h being so disposed that the solid constituents separated out in the hollow bodies can travel downwardly on the lower inclined walls g of the receptacle, whereas the water rises by reason of its lower specific gravity. The inlet channels are indicated at c'. The shape of the outlet ends h illustrated in these figures, that is to say, the provision of an upward flare by which the cross-section is increased, has the further purpose of enabling the liquid that has been clarified to rise even before leaving the hollow bodies.

Figure 5:
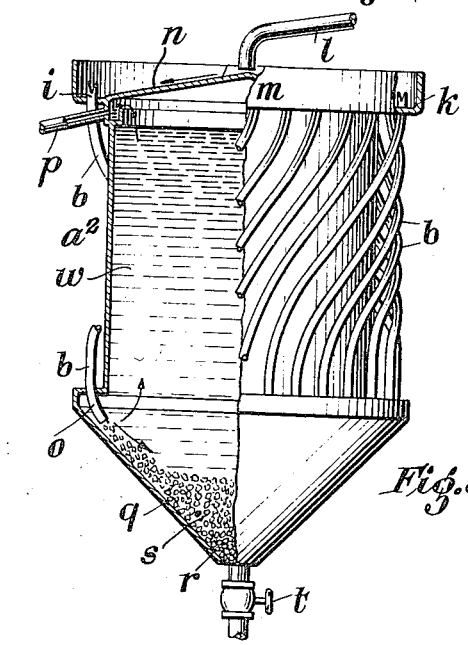
Fig. 5 is a side elevation, partly in section illustrating a clarifying apparatus in which the separating bodies are of spiral form and external to the receptacle, and, Fig. 6 is a partial top plan view of Fig. 5.
Figure 6:
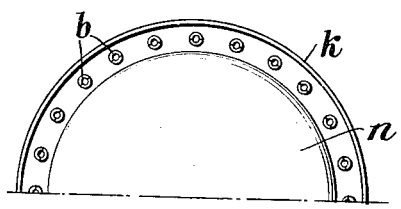

Figures 5 and 6 illustrate a construction particularly suitable for carrying out the clarifying operation, which construction is seen in Figure 5, on the left, in section, and, on the right, in elevation, and in Figure 6 from above.

This clarifying apparatus comprises the receptacle $a^2$ and a number of hollow bodies b which are wound in the form of helices around the receptacle, and whose upper ends, all projecting the same distance above the bottom of the feed channel k, are formed at i with slots which of a cross-section that increases towards the upper end of the slot. They are fed with slurry continuously or at intervals above the distributor hood m through the inlet conduit l, the slurry having first been thoroughly mixed, by means of an agitator with a precipitating agent which may consist of part of the slurry that has already settled.

The slurry flows over the inclined surface n of the distributor hood m into the delivery channel and at this point rises like a rising water level horizontally until it is able to pass through the slots in the hollow feed bodies. Instead of slots, notches, holes, nozzles or the like may be provided at the upper ends of the bodies b.

Laboratory experiments have shown that in the hollow bodies turbulent streams are produced under the action of the precipitating agent, the effect of which is to separate the solid constituents from the downwardly moving slurry and to cause them to travel along the lower wall of the hollow bodies. The speed of precipitation is increased by the slurry which is flowing in the same direction.

The lower ends o of the hollow bodies extend into the lower part of the receptacle $a^2$. At this point the clarified water, indicated at w, at once commences to rise in the receptacle $a^2$ and then issues forth through the discharge tube p which communicates with the interior of the receptacle, while the solid constituents sink onto the inclined wall q of the receptacle and pass to the drawing-off position r without being affected in any way by the upward flow of the liquid. On the way to the drawing-off position the downwardly travelling slurry s again thickens until it is drawn off through the valve t at the degree of concentration desired.

As the clarifying operation is carried out in the hollow bodies without any residue if the hollow bodies are of the correct dimensions while the slurry is flowing down, the speed at which the material passes through may be greater than in any other known clarifying apparatus in which the solid constituents are separated out from the rising slurry.

The clarifying operation produces very good results giving a large output and occupying little space. The fine particles may be recovered almost completely from the slurry and the clarified liquid may be used again.

We claim:

1. A process for the uninterrupted clarification of coal slurry and the like involving the use of a precipitating agent, consisting in supplying the slurry treated with the precipitating agent at the head of a receptacle of suitable form, inducing the downward flow of the said slurry and precipitating agent in a plurality of streams of small cross-section to the lower part of the receptacle where the streams unite to form a body of liquid of a larger cross-sectional area than the combined cross-sectional area of the streams, said streams being delivered into the body of liquid so as to be confined to a limited part of the said area so that the separated solid constituents are thereby concentrated collecting and further concentrating in the lower part of the receptacle the solid constituents separated out in the downward flow of the slurry and causing the clarified liquid of the slurry to rise upwardly in the receptacle, and withdrawing it at the top of the receptacle, the concentrated solid constituents being withdrawn from the receptacle.

2. Apparatus for the clarification of coal slurry and the like, comprising a receptacle, oppositely disposed channel-like supply members positioned upon the opposite walls of the receptacle at the upper end, a plurality of hollow tubular bodies arranged in groups disposed symmetrically with reference to a middle plane of the receptacle and connected at their upper ends to the said supply members and extending at opposite angles to the side of the receptacle to the lower part thereof, and outlets from the receptacle for the solid constituents and for the clarified liquid, the lower part of the receptacle having inclined walls upon which the solid constituents may collect.

3. Apparatus for the clarification of coal slurry and the like comprising a receptacle, a supply member for the slurry supported at the head of the receptacle, a number of tubular bodies symmetrically arranged and extending from the head of the receptacle at an inclination to the horizontal and opening at the lower end into the lower part of the receptacle, the said hollow bodies serving to effect the clarifying operation, and outlets from the receptacle for the solid constituents and for the clarified liquid.

4. Apparatus for the clarification of coal slurry and the like, comprising a receptacle, a channel-like supply member for the slurry extending along the wall of the receptacle at the upper end thereof, a number of tubular bodies connected at the upper end of the receptacle to the supply member at a uniform elevation and extending from the upper end of the receptacle in symmetrical disposition and at an inclination to the horizontal to the lower part of the receptacle and opening freely therein, and outlets from the receptacle for the solid constituents and for the clarified liquid respectively provided in the lower and upper parts of the receptacle.

5. Apparatus for the clarification of coal slurry and the like, comprising a receptacle, a channel-like supply member for the slurry extending along the wall of the receptacle at the upper end, a number of tubular bodies connected at the upper end of the receptacle to the supply member and extending in symmetrical disposition at an inclination to the horizontal to the lower part of the receptacle and opening freely therein, means provided at the upper ends of the tubular bodies for effecting the uniform charging of the said bodies with slurry from the supply member and outlets from the receptacle for the solid constituents and for the clarified liquid.

6. Apparatus for the clarification of coal slurry and the like, comprising a receptacle, a channel-like supply member for the slurry extending along the wall of the receptacle at the upper end, a number of tubular bodies connected at the upper end of the receptacle to the supply member at a uniform elevation and extending in symmetrical disposition at an inclination to the horizontal and helically in relation to the walls of the receptacle to the lower part of the receptacle and opening freely therein, the said hollow bodies serving to effect the clarification of the treated substance, and outlets from the receptacle for the solid constituents and for the clarified liquid respectively provided in the lower and upper parts of the receptacle.

FRITZ VOHMANN.
ERICH TRÜMPELMANN.